(12) United States Patent
Gold

(10) Patent No.: US 9,618,027 B1
(45) Date of Patent: Apr. 11, 2017

(54) ARTICULATING FASTENER

(71) Applicant: Peter Gold, Rockville Centre, NY (US)

(72) Inventor: Peter Gold, Rockville Centre, NY (US)

( * ) Notice: Subject to any disclaimer, the term of this patent is extended or adjusted under 35 U.S.C. 154(b) by 0 days.

(21) Appl. No.: 15/162,686

(22) Filed: May 24, 2016

(51) Int. Cl.
*F16B 19/00* (2006.01)
*F16B 19/08* (2006.01)
*F16B 21/08* (2006.01)

(52) U.S. Cl.
CPC ............ *F16B 19/004* (2013.01); *F16B 19/00* (2013.01); *F16B 19/002* (2013.01); *F16B 21/08* (2013.01); *F16B 21/086* (2013.01); *Y10T 29/4987* (2015.01); *Y10T 29/49826* (2015.01); *Y10T 29/49872* (2015.01)

(58) Field of Classification Search
CPC ...... F16B 19/00; F16B 19/002; F16B 19/004; F16B 21/08; F16B 21/082; Y10T 29/4987; Y10T 29/49872; Y10T 29/49826
USPC ........... 29/450, 451, 428; 411/500, 508, 510
See application file for complete search history.

(56) References Cited

U.S. PATENT DOCUMENTS

| | | | | |
|---|---|---|---|---|
| 2,687,862 A | * | 8/1954 | Crowther | F16B 9/023 248/27.3 |
| 3,220,078 A | * | 11/1965 | Preziosi | F16B 21/02 402/80 P |
| 3,954,344 A | * | 5/1976 | Nakama | F16B 21/02 403/14 |
| 4,342,139 A | * | 8/1982 | Tanaka | F16B 21/02 24/292 |
| 4,627,760 A | * | 12/1986 | Yagi | F16B 5/0614 174/138 D |
| 4,893,978 A | * | 1/1990 | Frano | A44B 99/005 24/297 |
| 5,011,356 A | * | 4/1991 | Fernandez | F16B 21/02 24/297 |
| 5,062,546 A | * | 11/1991 | Mackal | G05G 5/005 222/153.06 |
| 5,228,816 A | * | 7/1993 | Boville | F16B 5/0642 24/297 |
| 5,295,862 A | * | 3/1994 | Mosquera | H01R 12/707 29/895 |
| 5,368,261 A | * | 11/1994 | Caveney | F16L 3/233 248/69 |
| 5,607,323 A | * | 3/1997 | Foster | F16L 5/00 174/153 G |
| 5,675,875 A | * | 10/1997 | Servatius | A42B 3/20 2/424 |
| 5,907,891 A | * | 6/1999 | Meyer | F16B 19/004 24/297 |

(Continued)

*Primary Examiner* — Essama Omgba
*Assistant Examiner* — Bayan Salone
(74) *Attorney, Agent, or Firm* — Galgano IP Law PLLC; Thomas M. Galgano; Jessica G. McDonald

(57) ABSTRACT

A fastener for insertion into aligned openings in articles and method of use, the fastener having a head having a width greater than a width of the opening, a neck having a width less than the width of the opening, a resilient shank having a width greater than the width of the opening. The shank having a tapered end and a U-shaped channel, to define a line of weakness to permit the shank to articulate between a normal position where the shank has a width greater than the width of the opening and an insertion position where the shank is bent to have a width less than the width of the opening. The shank resiliently returns to its normal position once pushed in and through the opening with the neck received within the opening, locking the fastener within the opening.

19 Claims, 5 Drawing Sheets

(56) References Cited

U.S. PATENT DOCUMENTS

| | | | | |
|---|---|---|---|---|
| 6,499,782 B2 * | 12/2002 | Kwon | B60N 3/026 24/293 |
| 6,719,513 B1 * | 4/2004 | Moutousis | F16B 21/084 411/510 |
| 6,769,853 B2 * | 8/2004 | Perrot | F16B 5/0628 296/191 |
| 7,086,124 B2 * | 8/2006 | Del Pozo Abejon | B60J 3/0217 24/295 |
| 8,029,222 B2 * | 10/2011 | Nitsche | F16B 19/004 411/508 |
| 8,601,763 B2 * | 12/2013 | Bui | E04B 1/41 52/344 |
| 8,672,601 B2 * | 3/2014 | Nitsche | F16B 19/004 24/292 |
| 2003/0228205 A1 * | 12/2003 | Hochholzer | B60R 13/0206 411/508 |
| 2004/0052612 A1 * | 3/2004 | Miura | F16B 19/004 411/508 |
| 2010/0021267 A1 * | 1/2010 | Nitsche | F16B 19/004 411/510 |
| 2011/0083390 A1 * | 4/2011 | Bui | E04B 1/41 52/483.1 |
| 2012/0000061 A1 * | 1/2012 | Nitsche | F16B 19/004 29/525.01 |
| 2015/0063943 A1 * | 3/2015 | Morris | F16B 39/284 411/33 |

* cited by examiner

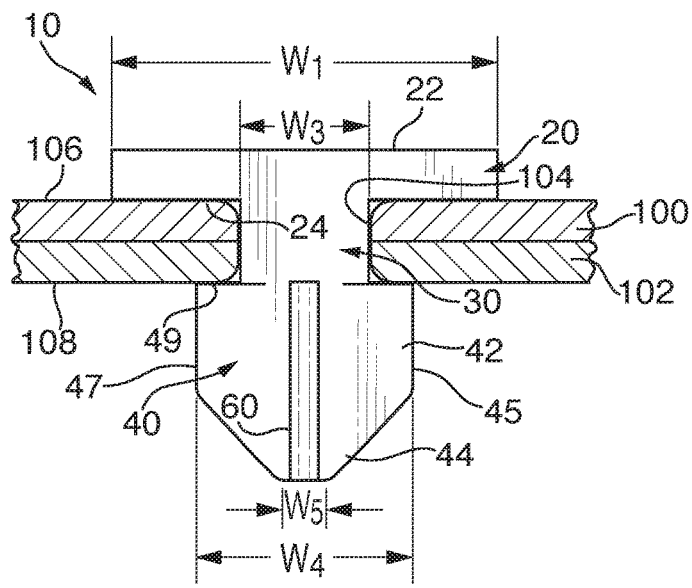
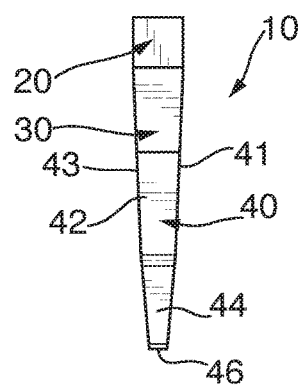
FIG. 4
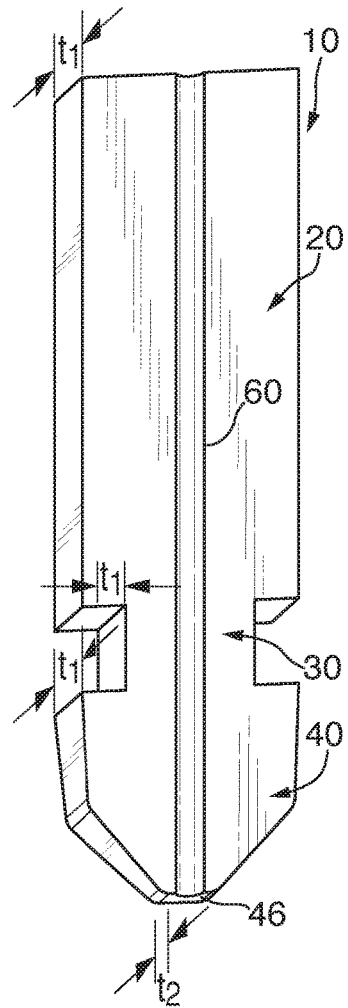
FIG. 5

ARTICULATING FASTENER

BACKGROUND OF THE INVENTION

Field of the Invention

The invention relates broadly to the field of fastening devices. More particularly, the present invention is a self-locking, push-in articulating fastener for attaching a plurality of articles together in a wide range of applications.

Brief Description of the Prior Art

Numerous anchoring and/or fastening devices are well known for use in retaining or mounting objects together. Push-in rivets are a commonly known type of fastener utilized in many applications including in many automotive applications, to secure objects together. Typically, the push-in rivet includes an inner shaft with a head and an outer housing having a plurality of barbs attached thereto with a central opening defined between the barbs for receipt of the inner shaft therein. Upon insertion of the push rivet into an opening in an object, the user presses the shaft towards the housing which causes the barbs to expand laterally outwardly to frictionally engage the sidewalls of the opening of the article it is inserted into.

However, disadvantageously, over time the frictional engagement of the barbs with the sidewalls of the opening weakens and the push rivet can become disengaged from the opening. This is even more so the case when the push rivet is used in automotive applications as vibrations and heat from the vehicle increases the chances for such disengagement of the rivet from the objects it is retaining. Accordingly, these types of mechanical fasteners do not create a sufficiently secure attachment between objects. Therefore, it is desirable to provide a fastener which more securely attaches objects together. Particularly, it is advantageous to have a fastener which more securely locks into place, which is relatively simple to use and manufacture, and which can be utilized in conjunction with a variety of applications.

The prior art discloses many different types of fastening devices or assemblies for retaining objects together. However, so far as is known, none of the prior art devices resolve all of these problems in a simple effective and yet highly advantageous manner as in the present invention discussed herein.

SUMMARY OF THE INVENTION

It is an object of the present invention to provide a novel articulating fastener and method of fastening using said fastener.

It is also an object of the present invention to provide a novel self-locking, push-in articulating fastener for securing a plurality of articles together.

It is yet another object of the present invention to provide a fastener which more securely fastens articles together by locking into place once inserted into an opening in an article.

It is a further object of the present invention to provide a fastener which is simple, quick, and easy to use and install.

It is yet another object of the present invention to provide a fastener which can be used for a variety of applications.

Accordingly, certain of the foregoing and related objects are readily attained according to the present invention by the provision of a self-locking, push-in articulating fastener for insertion into an opening defined in at least one article, comprising: a head having a lower surface and a width greater than a width of the opening in the at least one article; a neck connected to said lower surface of said head and having a width no greater than the width of the opening in the at least one article; a resilient, generally planar shank having a first end portion connected to said neck and an opposite tapered end portion having a second free end, said shank having two opposing generally planar faces joined by two opposing lateral side edges, said shank having a width greater than the width of the opening and said side edges of said tapered end portion taper inwardly generally in a direction towards said second free end of said shank, whereby said second free end of said shank is defined by a tip having a width which is less than the width of the opening; and wherein said shank has a longitudinally extending generally U-shaped channel formed in one of said faces of said shank, to define a line of weakness to permit said shank to bend along said channel and articulate between a first, normal position wherein said shank has a width greater than the width of the opening and a second, insertion position wherein said shank is bent along said channel so that said shank has a width less than the width of the opening, and wherein said shank resiliently returns to said normal position once pushed in and through the opening with said neck received within the opening, thereby locking the fastener in the opening.

In a preferred embodiment, said first end portion of said shank has an upper surface and said neck has two opposing lateral side edges having slits formed therein generally adjacent to said upper surface of said shank, to facilitate bending of said shank along said channel.

Additionally, in the preferred embodiment, a distance between said faces of said shank gradually decreases generally in a direction towards said second free end of said shank. Preferably, said first end portion of said shank has an upper surface and said neck has two opposing generally planar faces, and wherein a distance between said faces of said upper surface of said first end portion of said shank is the same as a distance between said faces of said neck.

Advantageously, said head has two opposing generally planar faces, and wherein a distance between said faces of said head is the same as said distance between said faces of said neck and said faces of said upper surface of said shank. Desirably, said head, neck, and shank are one piece.

In one embodiment, said width of said head is the same as a width of said first end portion of said shank. In another embodiment, said width of said head is greater than said width of said shank. Furthermore, in certain embodiments, said head is generally circular-shaped. Alternatively, in other embodiments, said head is generally rectangular-shaped.

Preferably, said U-shaped channel is formed in said shank and said neck. Alternatively, said U-shaped channel is formed in said shank, said neck, and said head. Additionally, it is preferred that the fastener further comprises a cover having a slot defined therein with a width less than said width of said head, said cover being made of a stretchable material to permit said cover to be stretched to expand said width of said slot to permit said slot to be received over said head and return to a normal, non-stretched position wherein said slot of said cover is received around said neck. Preferably, said cover is made of rubber. It is also preferable that said fastener is made of extruded plastic.

In addition, certain of the foregoing and related objects are also readily attained according to the present invention by the provision of a method of fastening, comprising: providing at least one article having an opening defined therein; providing a self-locking, push-in articulating fastener for insertion into said opening in said at least one article, comprising a head having a lower surface and a width greater than a width of said opening in said at least one article; a neck connected to said lower surface of said head and having a width no greater than said width of said opening in said at least one article; a resilient, generally planar shank having a first end portion connected to said neck and an opposite tapered end portion having a second free end, said shank having two opposing generally planar faces joined by two opposing lateral side edges, said shank having a width greater than said width of said opening and said side edges of said tapered end portion taper inwardly generally in a direction towards said second free end of said shank, whereby said second free end of said shank is defined by a tip having a width which is less than said width of said opening; and wherein said shank has a longitudinally extending generally U-shaped channel formed in one of said faces of said shank, to define a line of weakness to permit said shank to bend along said channel and articulate between a first, normal position wherein said shank has a width greater than said width of said opening and a second, insertion position wherein said shank is bent along said channel so that said shank has a width less than said width of said opening, and wherein said shank resiliently returns to said normal position once pushed in and through said opening with said neck received within said opening, thereby locking said fastener in said opening; inserting said tip of said shank into said opening in said at least one article; pushing said shank into said opening to cause said shank to bend along said channel and articulate from said normal position to said insertion position, wherein said width of said shank is less than said width of said opening, to permit said shank to be inserted into and through said opening; receiving said neck within said opening; and permitting said shank to resiliently return to said normal position, thereby locking said fastener within said opening.

Preferably, said at least one article has an upper surface and a lower surface and said first end portion of said shank has an upper surface, wherein when said fastener is locked within said opening, said lower surface of said head overlies said upper surface of said at least one article and said upper surface of said first end portion of said shank overlies said lower surface of said at least one article. It is also preferred that a plurality of articles each having an opening defined therein are provided and said shank is pushed through said openings in said plurality of articles and said neck is received within said openings in said plurality of articles. Advantageously, a distance between said faces of said shank gradually decreases generally in a direction towards said second free end of said shank.

Desirably, the method further comprises providing a cover having a slot defined therein with a width less than said width of said head, said cover being made of a stretchable material to permit said cover to be stretched to expand said width of said slot to permit said slot to be received over said head and return to a normal, non-stretched position wherein said slot of said cover is received around said neck; stretching said cover to expand said size of said slot to be greater than said width of said head; receiving said head of said fastener within said slot; and returning said cover to said normal, non-stretched position with said slot of said cover being received around said neck.

BRIEF DESCRIPTION OF THE DRAWINGS

Other objects and features of the present invention will become apparent from the detailed description considered in connection with the accompanying drawings, which disclose several embodiments of the invention. It is to be understood that the drawings are to be used for the purpose of illustration only and not as a definition of the limits of the invention.

FIG. 3 is a front elevational view of the fastener of FIG. 1 inserted into openings in two articles;

FIG. 4 is a side elevational view of the fastener of FIG. 1;

FIG. 5 is a perspective view of a second embodiment of the fastener according to the present invention, having an elongated head;

DETAILED DESCRIPTION OF THE PREFERRED EMBODIMENTS

Figure 1:
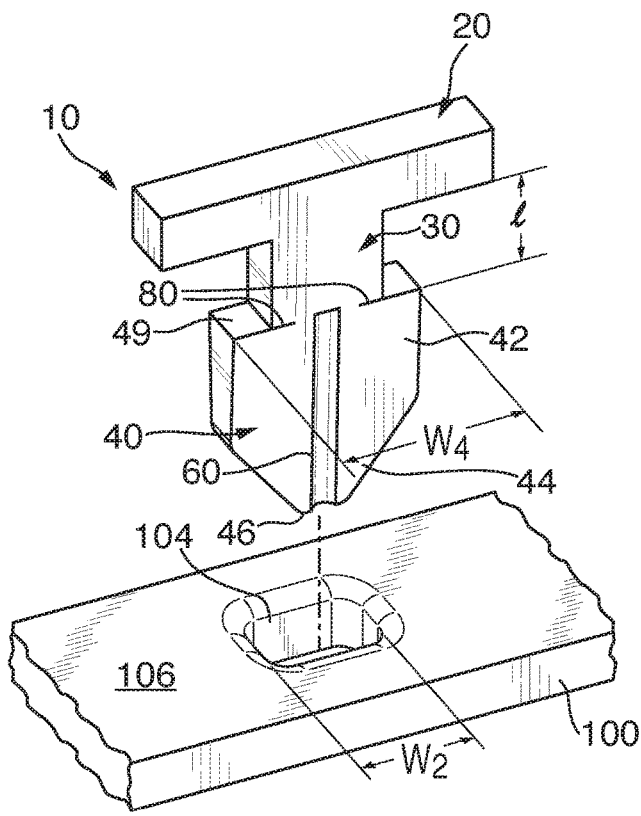
FIG. 1 is a perspective view of the fastener according to the present invention, prior to insertion into an opening formed in an article.

Turning now in detail to the drawings, and FIG. 1 in particular, which illustrates the novel self-locking, push-in articulating fastener according to the present invention, generally designated by reference numeral 10. Fastener 10 can be utilized in any number of applications and industries to attach a plurality of articles together by insertion of fastener 10 into openings 104 formed in a plurality of articles 100 and 102. Although opening 104 is illustrated as having an oval shape, the present invention is adaptable to openings having different sizes and shapes including round openings.

Figure 2:
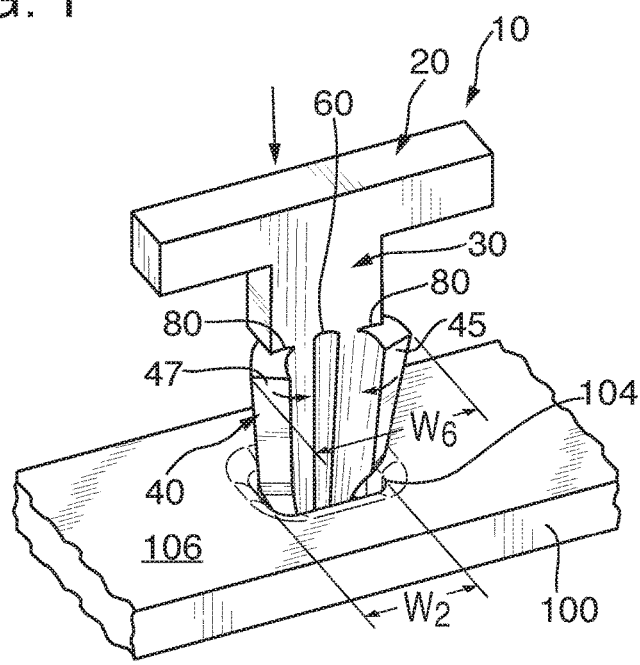
FIG. 2 is a perspective view of the fastener of FIG. 1 being bent along its U-shaped channel to permit insertion into the opening.

As seen best in FIGS. 1-3, fastener 10 comprises a head 20, connected to a neck 30, which is connected to a shank 40, for collectively securing a plurality of articles, such as articles 100 and 102 together. In the preferred embodiment, head 20, neck 30, and shank 40 are of a unitary one-piece construction. As shown in FIG. 3, in use, fastener 10 is inserted into coaxially aligned openings 104 of articles 100 and 102, and positioned such that head 20 is disposed on one side of the articles 100 and 102, here upper surface 106, shank 40 is disposed on the other side of articles 100 and 102, here lower surface 108, and neck 30 is received within openings 104 of articles 100 and 102. Particularly, as seen in FIG. 3, head 20 has an upper surface 22 and an opposite lower surface 24. Lower surface 24 of head 20 directly overlies upper surface 106 of article 100, once fastener 10 is inserted into its desired fastening position and upper surface 49 of shank 40 directly overlies lower surface 108 of article 102.

As also seen best in FIG. 3, head 20 has a width ω1 which is greater than width ω2 of openings 104 in articles 100 and 102, to prevent head 20 from being inserted into and/or through openings 104. It can be appreciated that the dimensions of fastener 10 and the width ω1 of head 20 may vary depending on the application and width ω2 of openings 104 in the articles fastener 10 is used to retain.

Figure 6:
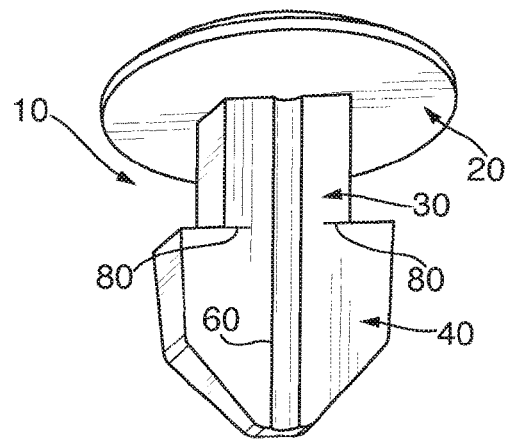
FIG. 6 is a perspective view of a third embodiment of the fastener according to the present invention, having a circular-shaped head.
Figure 7:
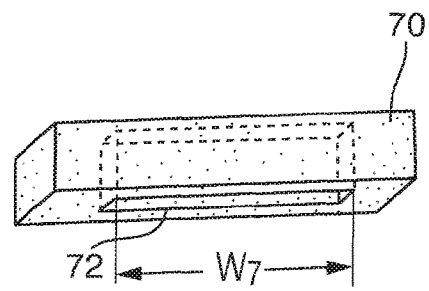
FIG. 7 is a perspective view of the stretchable cover according to the present invention.
Figure 8:
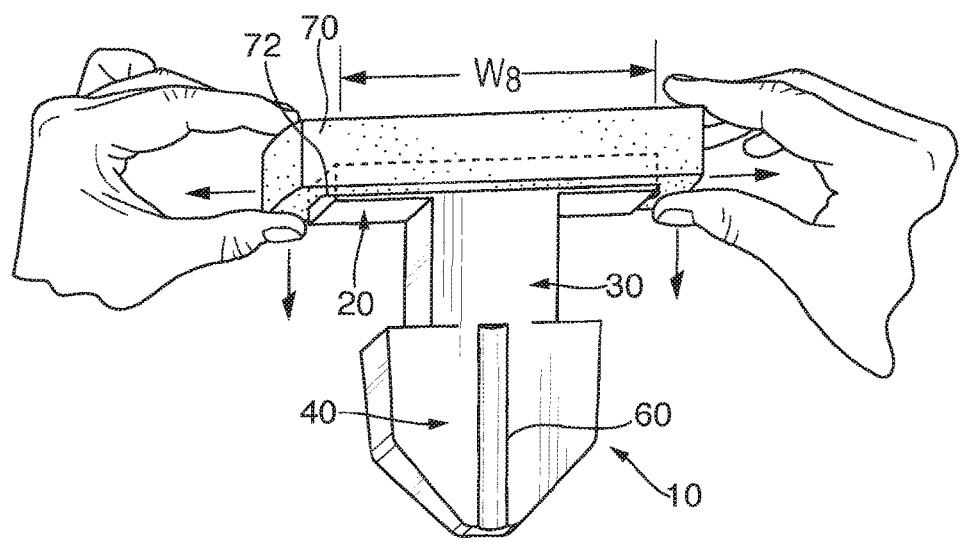
FIG. 8 is a perspective view showing the cover being stretched and placed over the head of the fastener.
Figure 9A:
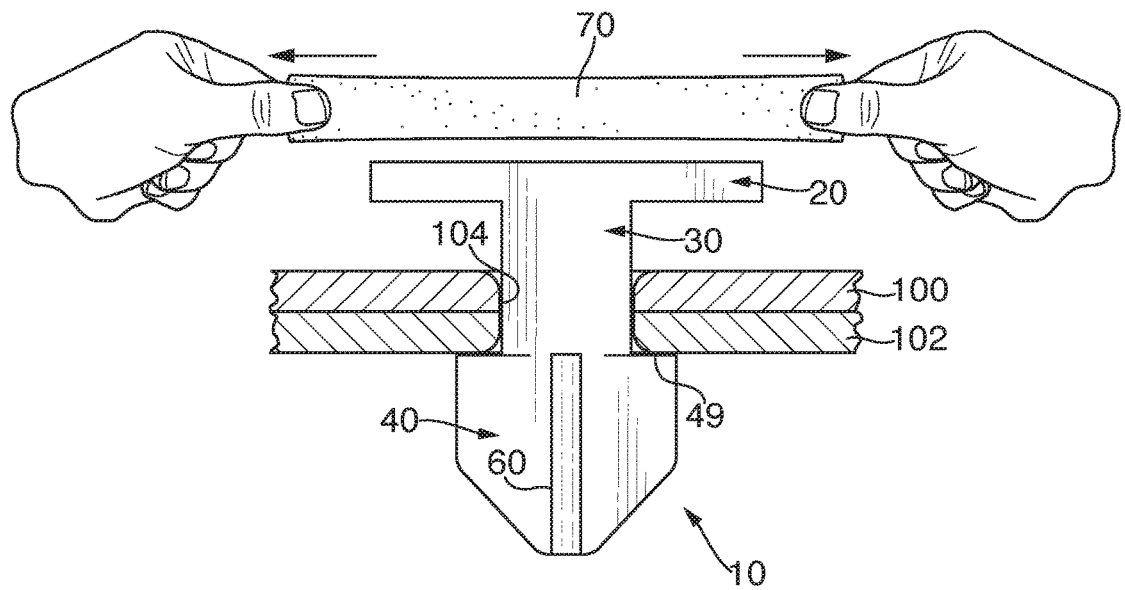
FIG. 9A is a front elevational view of the fastener inserted into openings in two articles and the cover being stretched and placed over the head of the fastener.
Figure 9B:
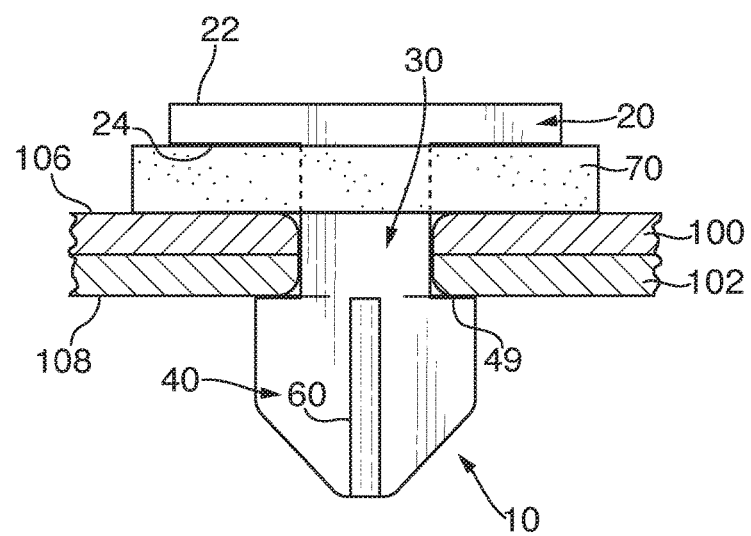
FIG. 9B is a front elevational view of the fastener of FIG. 9A, with the cover received over the neck of the fastener.
Figure 10:
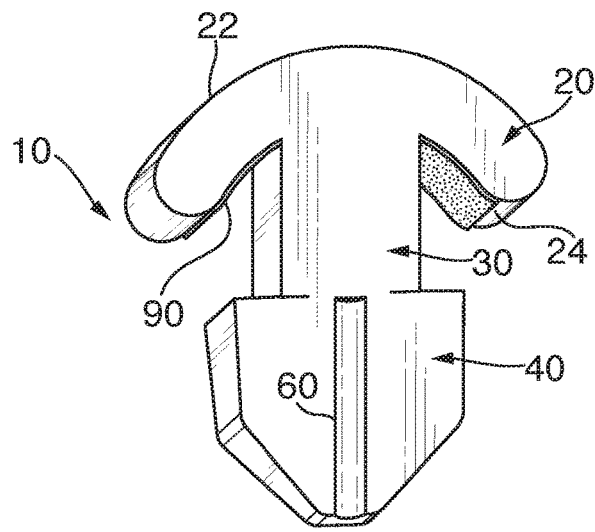
FIG. 10 is a perspective view of a fourth embodiment of the present invention, having a curved head.

As seen in the various embodiments of the fastener in FIGS. 1-11, head 20 may assume any number of sizes, shapes, and configurations as desired by the particular application fastener 10 is being utilized for, so long as the dimensions of head 20 are greater than the width ω2 of openings 104. For example, as seen in FIGS. 1-5, head 20 may be generally rectangular-shaped or, alternatively, as seen in FIG. 6, head 20 may be generally circular-shaped. In addition, as seen in FIG. 10, fastener 10 may have a head 20 which is curved having a concave lower surface 24 and a convex upper surface 22. In another embodiment illustrated in FIG. 11, head 20 forms a circular mushroom shape having a concave lower surface 24 and a convex upper surface 22. However, it can be appreciated that the head 20 may assume any number of shapes and configurations, as is desired including, for example, square-shaped or oval-shaped.

Figure 11:
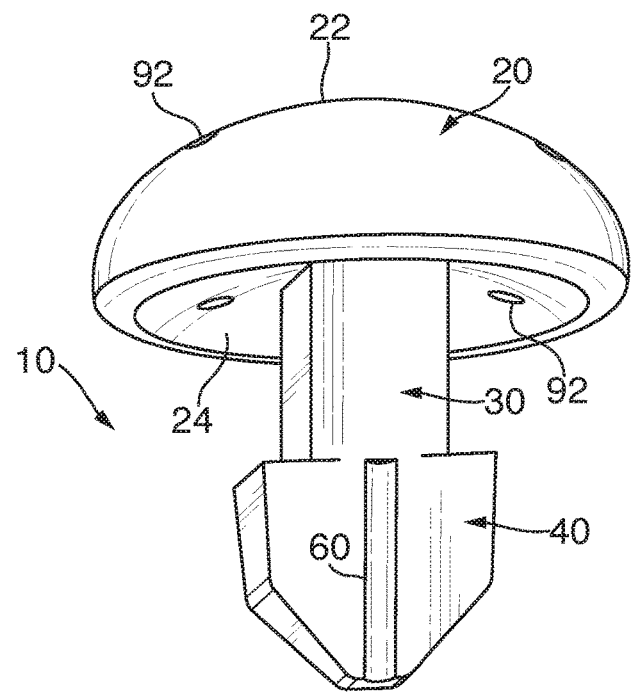
FIG. 11 is a perspective view of a fifth embodiment of the present invention, having a mushroom-shaped head.

In the embodiments shown in FIGS. 10 and 11, head 20 is able to flex in a longitudinal direction along fastener 10, to allow for easier insertion of fastener 10 into openings 104. Particularly, when fastener 10 is inserted into openings 104 and longitudinal force is applied to fastener 10, lower surface 24 of head 20 comes into contact with upper surface 106 of article 100. As a result of such longitudinal force, head 20 flexes in a direction away from shank 40, to permit shank 40 to extend further in order to clear lower surface 108 of article 102. To further secure head 20 against upper surface 106 of article 100, an adhesive layer 90 may be provided on lower surface 24 of head 20, as shown in FIG. 10. Adhesive layer 90 may be covered with a removable backing layer (not shown), which can be removed prior to use of fastener 10. Alternatively, as seen in FIG. 11, openings 92 may be defined in head 20, to allow for the insertion of adhesive through head 20, to fill a gap or space between lower surface 24 of head 20 and upper surface 106 of article 100 and secure fastener 10 in place.

As seen in FIGS. 1-11, lower surface 24 of head 20 is connected to neck 30. As seen best in FIG. 3, neck 30 is defined in between lower surface 24 of head 20 and upper surface 49 of shank 40. As also shown best in FIG. 3, neck 30 is indented from head 20 and shank 40 has a more narrow width ω3. Width ω3 is no greater than the width ω2 of the openings 104 in articles 100 and 102, to permit neck 30 to be received within openings 104. Neck 30 also has a width ω3 which is less than the width ω1 of head 20 and width ω4 of shank 40. It is preferable that neck 30 have a length l that generally corresponds to the collective thickness of the articles it is being utilized to secure, here articles 100 and 102, so that openings 104 are received around the neck 30 with lower surface 24 of head 20 securely abutting upper surface 106 of article 100 and lower surface 108 of article 102 securely abutting upper surface 49 of shank 40, with a tight friction fit. It is also preferable that width ω3 of neck 30 generally corresponds to the width ω2 of openings 104, so that neck 30 securely fits within openings 104 with a tight friction fit. It can be appreciated that the length l of neck 30 can vary depending on the collective thickness of the articles fastener 10 is being used to retain. Similarly, width ω3 of neck 30 may vary depending on the width ω2 of openings 104. However, it is preferable that neck 30 of fastener 10 fit within openings 104 with a tight friction fit with minimal movement.

Attached to the opposite end of neck 30 from head 20 is a resilient, generally planar shank 40. Particularly, as seen in FIGS. 1-4, shank 40 has a first end portion 42 connected to neck 30 and an opposite tapered end portion 44 having a free end 46. Shank 40 is formed of two opposing generally planar faces 41 and 43 (see FIG. 4) joined together by two opposing lateral side edges 45, 47 (see, FIG. 2). As seen in FIG. 3, shank 40 has a maximum width ω4 which is greater than width ω2 of openings 104 and width ω3 of neck 30. It can be appreciated that the dimensions and width of shank 40 can vary depending on the application and the size of openings 104, it is being used in conjunction with, so long as shank 40 normally has a width greater than the width of the openings 104 and can bend to allow for insertion into and through the openings it is being inserted into.

As seen best in FIG. 3, side edges 45 and 47 of tapered end portion 44 taper inwardly generally in a direction towards second free end 46 of shank 40. As also seen in FIG. 3, first end portion 42 has a generally uniform width which is greater than the width of tapered end portion 44. However, it can be appreciated that the width of the first end portion 42 and tapered end portion 44 may both taper. The tapered width of shank 40 facilitates bending and insertion of shank 40 into and through openings 104. Particularly, second free end 46 of shank 40 is defined by a tip having a width ω5 which is less than the maximum width ω4 of shank 40 and width ω2 of openings 104.

Furthermore, as seen in FIGS. 1-3, shank 40 has a longitudinally extending, generally centrally disposed, U-shaped channel 60 formed in one of the faces of fastener 10, here face 41 of shank 40. Channel 60 defines a line of weakness in shank 40, which permits shank 40 to bend along channel 60, such as in the manner set forth in FIG. 2.

The length of channel 60 can vary. As shown in FIGS. 1-3, U-shaped channel 60 is formed in shank 40 only. In another embodiment of the present invention, as seen in FIG. 6, U-shaped channel 60 is formed in both shank 40 and neck 30. In yet another embodiment, as seen in FIG. 5, U-shaped channel 60 extends the length of fastener 10 and is formed in shank 40, neck 30, and head 20.

Particularly, upon the application of longitudinal force in a direction perpendicular to articles 100 and 102, shank 40 articulates between a first, normal position, as seen in FIG. 1, where shank 40 has a maximum width ω4 which is greater than the width ω2 of openings 104, to a second, insertion position as shown in FIG. 2, where shank 40 is bent along channel 60 so that shank 40 has a width ω6 which is narrower than the width ω2 of openings 104, to permit insertion of shank 40 into and through openings 104. Optionally, as shown best in FIG. 2, in order to facilitate bending of shank 40 along channel 60, slits or cuts 80 are formed in neck 30. Particularly, slits 80 extend partially through neck 30 in a position generally adjacent and parallel to upper surface 49 of shank 40. In use, shank 40 is able to bend and articulate along channel 60 by the application of longitudinal force to the tapered end portion 44 of shank 40. This force causes lateral side edges 45 and 47 to bend inwardly along central channel 60 causing the overall width of shank 40 to decrease. The provision of slits 80 permits shank 40 to bend to a sufficiently small width to allow for easier insertion of shank 40 through openings 104. Furthermore, since slits 80 are just cuts made in neck 30, without removal of any portion of neck 30, they do not compromise the strength or integrity of fastener 10.

In the insertion position as in FIG. 2, shank 40 has a width ω6 which is less than width ω2 of openings 104, to allow shank 40 to be inserted into and through openings 104. As seen in FIG. 3, once shank 40 has been fully inserted into and through openings 104 and neck 30 is received within openings 104, the force applied against shank 40 ceases and, as a result of the resilient nature of shank 40, shank 40 resiliently returns to its normal position having a width ω4 which is greater than the width ω2 of openings 104, thereby locking the fastener 10 within the openings 104 to hold articles 100 and 102 together. It is preferable that once inserted, lower surface 24 of head 20 overlies upper face 106 of article 100 and lower surface 108 of article 102 overlies upper surface 49 of shank 40, with a tight friction fit.

In the preferred embodiment, the present invention is made of an extruded plastic material or by injection molding. However, the present invention may be made of other suitable materials, including, for example, ethylene propylene diene monomer (EPDM) rubber, spring steel, and SANTOPRENE thermoplastic vulcanizates (TPVs) manufactured by Exxon Mobil Corporation of Irving, Tex. The present invention may also be made with a combination of steel and polymers with, for example, different elements of the present invention being made of different materials.

Additionally, in the preferred embodiment, as shown best in FIGS. 4-5, the thickness of shank 40 between faces 41 and 43 gradually decreases and tapers from a greater thickness t1 at upper surface 49 of shank 40 to a smaller thickness t2, generally in a direction towards second free end 46 of shank 40. In a preferred embodiment as illustrated in FIG. 5, neck 30 has a thickness t1 which is the same as thickness t1 of upper surface 49 of shank 40. Also in the preferred embodiment in FIG. 5, head 20 has a thickness t1 which is the same as the thickness t1 of neck 30, and upper surface 49 of shank 40.

The material of fastener 10 is sufficiently rigid on head 20 and neck 30. However, the thinner thickness of material on shank 40 in conjunction with the U-shaped channel 60, and optional slits 80, permits shank 40 to bend along channel 60. Furthermore, the material and thickness of shank 40 permits shank 40 to have sufficient resiliency to return to its normal, unbent position, having a maximum width ω4 once the force causing shank 40 to bend via U-shaped channel 60 has been released, thus causing shank 40 to resiliently return to its normal, unbent position, as seen in FIG. 3.

The various dimensions of fastener 10 can vary according to the particular application and the size of articles 100, 102 and openings 104, it is used to fasten. In a preferred embodiment, width ω1 of head 20 is the same as the width ω4 of shank 40, such as in the embodiment of FIG. 5. In another embodiment, width ω1 of head 20 is greater than the maximum width ω4 of shank 40, such as in the embodiments illustrated in FIGS. 1-3, 6, 8, 9A-9B, and 10-11.

Additionally, as seen in FIGS. 7-9B, fastener 10 further includes an optional, separate cover 70, which can be utilized for a more clean and finished appearance. Cover 70 has a slot 72 defined therein. In its normal position, slot 72 has a width ω7 which is less than width ω1 of head 20. Cover 70 is made of a stretchable material, and preferably rubber, to permit cover 70 to be stretched from its normal position in FIG. 7, to an expanded position as in FIGS. 8 and 9A. In the expanded position, cover 70 is stretched so that the width of slot 72 is expanded to a width ω8 which is greater than width ω1 of head 20, to permit slot 72 to be received over head 20, as in FIGS. 8 and 9A. Head 20 is then inserted into and through slot 72 (such as in FIG. 8) with neck 30 received within slot 72, as seen in FIG. 9B. Once positioned in this configuration, cover 70 resiliently returns to its normal, non-stretched position having slot 72 with width ω7, received around neck 30. Fastener 10 with cover 70 received thereon, can then be inserted into openings 104, in the same manner as described above and as seen in FIG. 9B, until neck 30 is received within openings 104, with cover 70 overlying the upper surface 106 of article 100.

As described above, fastener 10 is utilized to attach together a plurality of articles 100 and 102 having coaxially aligned openings 104 formed therein. It can be appreciated that any number of articles may be joined together using fastener 10. Particularly, as seen in FIG. 1, tip 46 of shank 40 is aligned with the coaxially aligned openings 104 of articles 100, 102. As seen in FIG. 2, the user then inserts tip 46 into openings 104, and applies longitudinal force to the head 20 of fastener 10, either by hand or with the use of a hammer or other hand tool, to cause shank 40 to enter into openings 104. The force applied by pushing shank 40 into openings 104 in conjunction with the tapered angle of tapered end portion 44 and slots 80, causes shank 40 to bend along channel 60 with side edges 45, 47 folding inwardly so that fastener 10 articulates from its normal position, as seen in FIG. 1, to an insertion position, as seen in FIG. 2. In the insertion position as in FIG. 2, side edges 45 and 47 of shank 40 fold inwardly along channel 60, to a more compact configuration having a width ω6 which is less than width ω2 of openings 104. Such bending causes shank 40 to have a width which is smaller than openings 104, to permit shank 40 to be inserted into and through openings 104. Once shank 40 has been inserted fully through openings 104, as seen in FIG. 3, neck 30 is received within openings 104, since it has a width ω3 which is less than width ω2 of openings 104. When neck 30 is received within openings 104, the force causing shank 40 to bend ceases and due to the resilient nature of shank 40, shank 40 returns to its normal position having width ω4 greater than width ω2 of openings 104, thereby self-locking fastener 10 within openings 104, to securely hold articles 100 and 102 together. Once fastener 10 is locked within openings 104, as shown in FIG. 3, neck 30 is received within openings 104, lower surface 24 of head 20 overlies upper surface 106 of article 100, and the upper surface 49 of first end portion 42 of shank 40 overlies lower surface 108 of article 102. It is preferable that fastener 10 fits with a tight friction fit within openings 104 to prevent movement of articles 100 and 102.

While particular embodiments of the invention have been described, it is not intended that the invention be limited thereto, as it is intended that the invention be as broad in scope as the prior art will allow and that the specification be read likewise. It will therefore be appreciated by those skilled in the art that other modifications could be made thereto without departing from the spirit and scope of the invention.

What is claimed is:

1. A self-locking, push-in articulating fastener for insertion into an opening defined in at least one article, comprising:
   a head having a lower surface and a width greater than a width of the opening in the at least one article;
   a neck connected to said lower surface of said head and having a width no greater than the width of the opening in the at least one article;
   a resilient, generally planar shank having a first end portion connected to said neck and an opposite tapered end portion having a second free end, said shank having two opposing generally planar faces joined by two opposing lateral side edges, said side edges of said tapered end portion taper inwardly generally in a direction towards said second free end of said shank, whereby said second free end of said shank is defined by a tip having a width which is less than the width of the opening;
   and wherein said shank is bendable from a first, normal position wherein said first end portion of said shank has a width greater than the width of the opening to a second, insertion position wherein said shank has a width less than the width of the opening and wherein said shank has a longitudinally extending generally U-shaped channel formed in one of said faces of said shank, to define a line of weakness to permit said shank to bend along said channel and articulate between said first, normal position and said second, insertion position wherein said shank is bent along said channel so that said shank has a width less than the width of the opening, and wherein said shank resiliently returns to said normal position once pushed in and through the opening with said neck received within the opening, thereby locking the fastener in the opening;

and wherein said first end portion of said shank has an upper surface and said neck has two opposing lateral side edges having slits formed therein in alignment with and generally parallel to said upper surface of said shank, to facilitate bending of said shank along said channel.

2. The fastener according to claim 1, wherein:
a distance between said faces of said shank gradually decreases generally in a direction towards said second free end of said shank.

3. The fastener according to claim 1, wherein:
said first end portion of said shank has an upper surface and said neck has two opposing generally planar faces, and wherein a distance between said faces of said upper surface of said first end portion of said shank is the same as a distance between said faces of said neck.

4. The fastener according to claim 3, wherein:
said head has two opposing generally planar faces, and wherein a distance between said faces of said head is the same as said distance between said faces of said neck and said faces of said upper surface of said shank.

5. The fastener according to claim 1, wherein:
said head, neck, and shank are one piece.

6. The fastener according to claim 1, wherein:
said width of said head is the same as a width of said first end portion of said shank.

7. The fastener according to claim 1, wherein:
said width of said head is greater than said width of said shank.

8. The fastener according to claim 1, wherein:
said head is generally circular-shaped.

9. The fastener according to claim 1, wherein:
said head is generally rectangular-shaped.

10. The fastener according to claim 1, wherein:
said U-shaped channel is formed in said shank and said neck.

11. The fastener according to claim 1, wherein:
said U-shaped channel is formed in said shank, said neck, and said head.

12. The fastener according to claim 1, further comprising:
a cover having a slot defined therein with a width less than said width of said head, said cover being made of a stretchable material to permit said cover to be stretched to expand said width of said slot to permit said slot to be received over said head and return to a normal, non-stretched position wherein said slot of said cover is received around said neck.

13. The fastener according to claim 12, wherein:
said cover is made of rubber.

14. The fastener according to claim 1, wherein:
said fastener is made of extruded plastic.

15. A method of fastening, comprising:
providing at least one article having an opening defined therein;

providing a self-locking, push-in articulating fastener for insertion into said opening in said at least one article, comprising a head having a lower surface and a width greater than a width of said opening in said at least one article; a neck connected to said lower surface of said head and having a width no greater than said width of said opening in said at least one article; a resilient, generally planar shank having a first end portion connected to said neck and an opposite tapered end portion having a second free end, said shank having two opposing generally planar faces joined by two opposing lateral side edges, said side edges of said tapered end portion taper inwardly generally in a direction towards said second free end of said shank, whereby said second free end of said shank is defined by a tip having a width which is less than said width of said opening; and wherein said shank is bendable from a first, normal position wherein said first end portion of said shank has a width greater than the width of the opening to a second, insertion position wherein said shank has a width less than the width of the opening and wherein said shank has a longitudinally extending generally U-shaped channel formed in one of said faces of said shank, to define a line of weakness to permit said shank to bend along said channel and articulate between said first, normal position and said second, insertion position wherein said shank is bent along said channel so that said shank has a width less than said width of said opening, and wherein said shank resiliently returns to said normal position once pushed in and through said opening with said neck received within said opening, thereby locking said fastener in said opening; and wherein said first end portion of said shank has an upper surface and said neck has two opposing lateral side edges having slits formed therein in alignment with and generally parallel to said upper surface of said shank, to facilitate bending of said shank along said channel;

inserting said tip of said shank into said opening in said at least one article;

pushing said shank into said opening to cause said shank to bend along said channel and articulate from said normal position to said insertion position, wherein said width of said shank is less than said width of said opening, to permit said shank to be inserted into and through said opening;

receiving said neck within said opening; and permitting said shank to resiliently return to said normal position, thereby locking said fastener within said opening.

16. The method according to claim 15, wherein:
said at least one article has an upper surface and a lower surface and said first end portion of said shank has an upper surface, wherein when said fastener is locked within said opening, said lower surface of said head overlies said upper surface of said at least one article and said upper surface of said first end portion of said shank overlies said lower surface of said at least one article.

17. The method according to claim 15, wherein:
a plurality of articles each having an opening defined therein are provided and said shank is pushed through said openings in said plurality of articles and said neck is received within said openings in said plurality of articles.

18. The method according to claim 15, wherein:
a distance between said faces of said shank gradually decreases generally in a direction towards said second free end of said shank.

19. The method according to claim 15, further comprising:
providing a cover having a slot defined therein with a width less than said width of said head, said cover being made of a stretchable material to permit said cover to be stretched to expand said width of said slot to permit said slot to be received over said head and return to a normal, non-stretched position wherein said slot of said cover is received around said neck;
stretching said cover to expand said size of said slot to be greater than said width of said head;
receiving said head of said fastener within said slot; and
returning said cover to said normal, non-stretched position with said slot of said cover being received around said neck.

* * * * *